(12) United States Patent
Poulter et al.

(10) Patent No.: US 6,428,330 B1
(45) Date of Patent: Aug. 6, 2002

(54) NETWORK EXTENDER

(75) Inventors: Alan R Poulter, Bedford; Richard N Bayfield, Milton Keynes; Paul J Moran; Quang T Tran, both of Hemel Hempstead; Sharon L Wiles, Bedford; David Whitfield, Surbiton, all of (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/945,614

(22) Filed: Sep. 5, 2001

(30) Foreign Application Priority Data

Apr. 20, 2001 (GB) ............................................. 0109701

(51) Int. Cl.⁷ ............................................... H01R 12/00
(52) U.S. Cl. ...................... 439/76.1; 439/607; 439/638
(58) Field of Search ................................ 439/701, 76.1, 439/731, 465, 687, 628, 638, 607; 361/752, 754, 816, 818; 174/35 R

(56) References Cited

U.S. PATENT DOCUMENTS 4,418,972 A * 12/1983 Benasutti .................... 439/607
5,227,955 A * 7/1993 Le Bris et al. ............ 174/52.1
5,696,669 A * 12/1997 Bassler et al. ............ 174/35 R
6,240,101 B1 * 5/2001 Co et al. ..................... 370/438

FOREIGN PATENT DOCUMENTS

| GB | 2268668 A | 1/1994 |
| GB | 2338155 A | 12/1999 |
| GB | 2350032 A | 11/2000 |
| GB | 2350530 A | 11/2000 |

* cited by examiner

*Primary Examiner*—Tulsidas Patel
(74) *Attorney, Agent, or Firm*—Nixon & Vanderhye P.C.

(57) ABSTRACT

An extender for use in with a cascade stack of network devices comprises an electronic circuit which has three ports, and circuit connections coupling each of the three ports to each of the other two ports; port connectors for each port; a two-part housing of which a first part has an end wall apertured for the protrusion of a first and a second of the connectors and a second part has an end wall apertured for the protrusion of a third of the port connectors; and screw fixings for securing the housing parts together.

11 Claims, 6 Drawing Sheets

NETWORK EXTENDER

RELATED APPLICATIONS

This application is related to the following copending commonly assigned applications:

1) Ser. No. 09/662,158 filed Sep. 14, 2000 entitled "Cascade Architecture and Operation for Packed-Based Communication Systems" and naming as inventors: Poulter et al,
2) Ser. No. 29/148,797 filed Sep. 21, 2001 entitled "Printed Circuit Board" and naming as inventors: Poulter et al.

FIELD OF THE INVENTION

This invention relates to network extenders, particularly enabling the connection of network units in a stack and more particularly to a three port extender by means of which a network unit such as a switch can be connected to two other similar or compatible units, the extender providing a cascade connection between the various units. The invention particularly concerns an improved construction of extender.

BACKGROUND TO THE INVENTION

It is known to dispose a multiplicity of network units such as hubs or switches that have a multiplicity of ports for the sending and reception of addressed data packets in a 'stack' which can be managed as a single logical entity. In principle, packets received at any of the active ports of any of the units in a stack can be sent from any of the active ports of the other units in the stack. The main purpose is to enable the provision of a unit which has a much larger number of ports than conveniently be provided on a single unit. A stack of units is normally provided with a cascade connection by means of which packets are conveyed between the units in the stack and by means of which control and status messages are passed between the units.

A particularly versatile form of cascade is the subject of Poulter et al. Ser. No. 09/662,158 filed Sep. 14 2000 and commonly assigned herewith. That patent application describes a 'hot swap' cascade in which the cascade connection includes at least one 'T-piece', that is to say a three-port extender of which a first port is connected to a respective unit in the stack and the other two ports are each connected either to another unit in the stack or to another extender, depending on the number of units provided in the stack. Internally the extenders are organised so that control messages and data packets can be passed up and down the cascade and so that irrespective of the state of the unit to which the first port is connected, there is a connection for control messages and data packets between the 'other' two ports.

SUMMARY OF THE INVENTION

The present invention in one particular form provides an improved three-port extender for use in a system as described in the foregoing co-pending application or in other similar contexts where a three-port connector is useful or appropriate. However, various features of the extender have utility in a broader context particularly where an extender has at least three ports and requires substantial logic and/or multiplexing arrangements so that signals are properly directed within the extender.

A particularly preferred form of the invention comprises a two-piece housing which have flanged and rebated peripheries so that the two pieces fit together to enclose a printed circuit board having the operative circuits of the extender. The circuits of the extender include a plurality of port connectors of which one extends through an end wall of one of the housing parts and of which at least two extend through an end wall of the other housing part. Preferably the housing parts are sputtered or otherwise coated with conductive material so as to form a Faraday cage. Fixing screws for securing the housing parts together extend through an end wall of one housing part to anchorage points in the other housing part and engage an apertured plate disposed against the end wall of the one housing part so that the metal fixing screws are maintained at the same potential as the cage and do not act as aerials.

DETAILED DESCRIPTION OF A PREFERRED EXAMPLE

Figure 1:
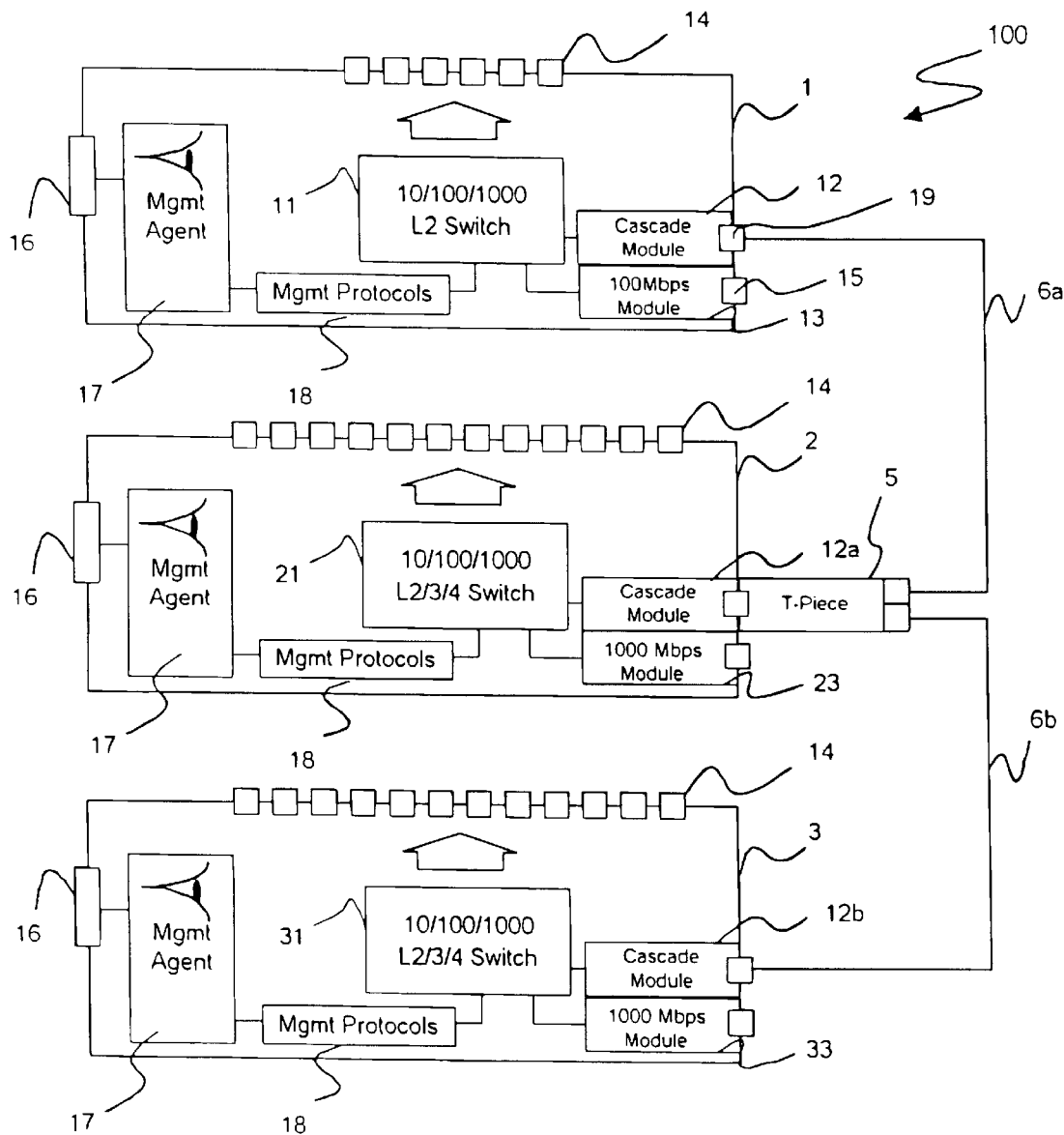
FIG. 1 illustrates a typical context in which an extender according to the present invention may be employed.

FIG. 1 of the drawings illustrates a context for an extender according to the invention and shows a stack 100 of network units. At the 'top' of the stack is a multi-port unit 1 which may include a network switch 11. This unit 1 has in this example provision for two plug-in modules, a cascade module 12 and a fibre transceiver module 13. Each module occupies a respective slot in the unit 1. The switch has a multiplicity of network ports 14 and the transceiver module has a respective port 15. The unit includes a console 16 and a 'management agent' 17 controlling the switch 18 by way of (schematically illustrated) management protocols 18.

The cascade module 12 serves to connect the switch 1 to a cascade by way of a port 19 and a cable 6a. Otherwise the switch is in known form and will not be described in detail.

A second unit 2 includes a 12-port switch 21 and also has two slots for plug-in modules. One slot is occupied by a cascade module 12a. The other slot has a 1000 Mbps transceiver module 23. This unit 2 has a console 16, a management agent 17 controlling the switch 21 by means of management protocols 18 as previously described.

A third unit 3 in the stack includes a switch 31, a console 16, a management agent 17, management protocols 18 as previously described as well as two slots one of which contains a cascade module 12b and a 1000 Mbps transceiver module 33.

In order to connect the units 1, 2 and 3 in a stack with a proper cascade connection enabling transmission of data packets as well as control messages between the units 1, 2 and 3, an extender 5 is shown as connected to the cascade module 12a and by way of respective ports and cables 6a and 6b to the cascade module 12 and the cascade module 12b.

The arrangement as so far described is common to the aforementioned Ser. No. 09/662,158 which describes the functional operation of the extender 5 and the cascade modules in considerable detail. All the details of that description will not be repeated here. In that and similar contexts an extender 5, which has a port for engagement with a respective unit and ports for connection to other units or other extenders, provides a convenient and versatile way in which a stack of units may be constituted.

Figure 2:
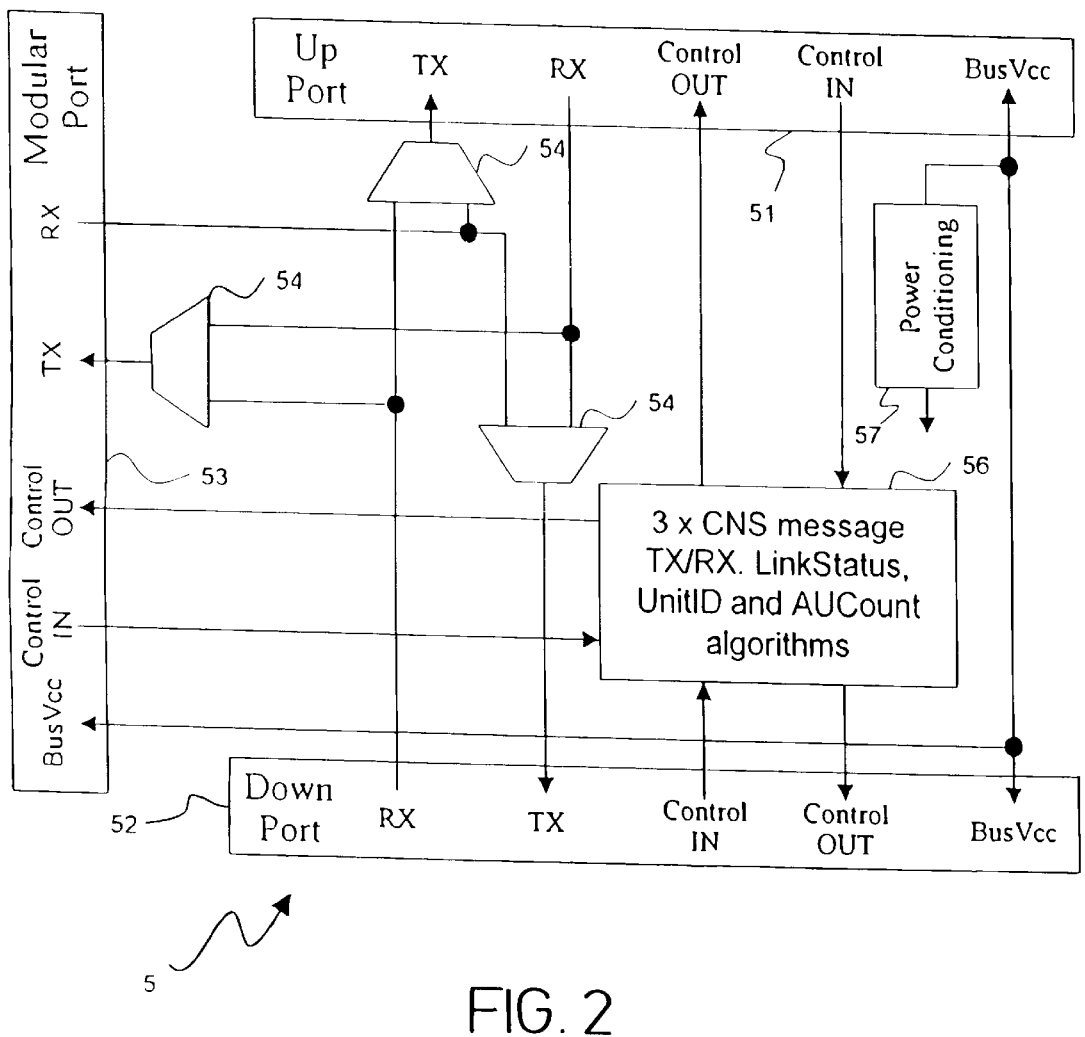
FIG. 2 illustrates the internal electrical layout of one form of extender according to the invention.

FIG. 2 illustrates schematically and in a broad manner the main features of an extender 5 as described in the aforementioned earlier application. The extender has three ports 51, 52 and 53. These are conveniently termed the 'up' port, the 'down' port and the 'modular' port respectively. Each of them has a respective lines or pairs of lines for sending packets from the up port (TX), for receiving packets at the up port (RX), for sending control messages (OUT), for receiving control messages (IN) and for the conveyance of a common rail potential (BusVcc).

As is described in the earlier application, and repeated here for convenience, one of the purposes of the 3-port extender is to employ control messages which are used to develop an active unit count for the stack, that is to say a count of the actual units which are active. The extender also participates in the computation of identification numbering (UnitID) for the units in the stack so that the flow of packets between the units in the stack can be properly controlled, as described in considerable detail in the aforementioned application.

Data packets received at any one of the ports may need directing to the TX path of one or other of the other two ports. Thus multiplexers 54 are coupled between the RX lines of a respective pair of the ports and the TX line of the third port as the case may be. The BusVcc lines are connected to a power conditioning circuit and the various control lines both IN and OUT are connected to a logic circuit 56 which receives the control messages (CNS), determines the TX and RX link status in each case and participates in the performance of the UnitID and AUCount algorithms. All these features are described in considerable detail in the aforementioned application. However, although the internal organisation of the extender can be varied, it will be apparent that owing to the need for signal switching and processing within the extender, an extender of this general kind not only contains various heat sources but will also require internal and external protection against electromagnetic interference.

An aspect of the invention is therefore the provision of the extender as a multi-part housing wherein the housing and the mutual fixing devices constitute a Faraday cage.

Figure 3:
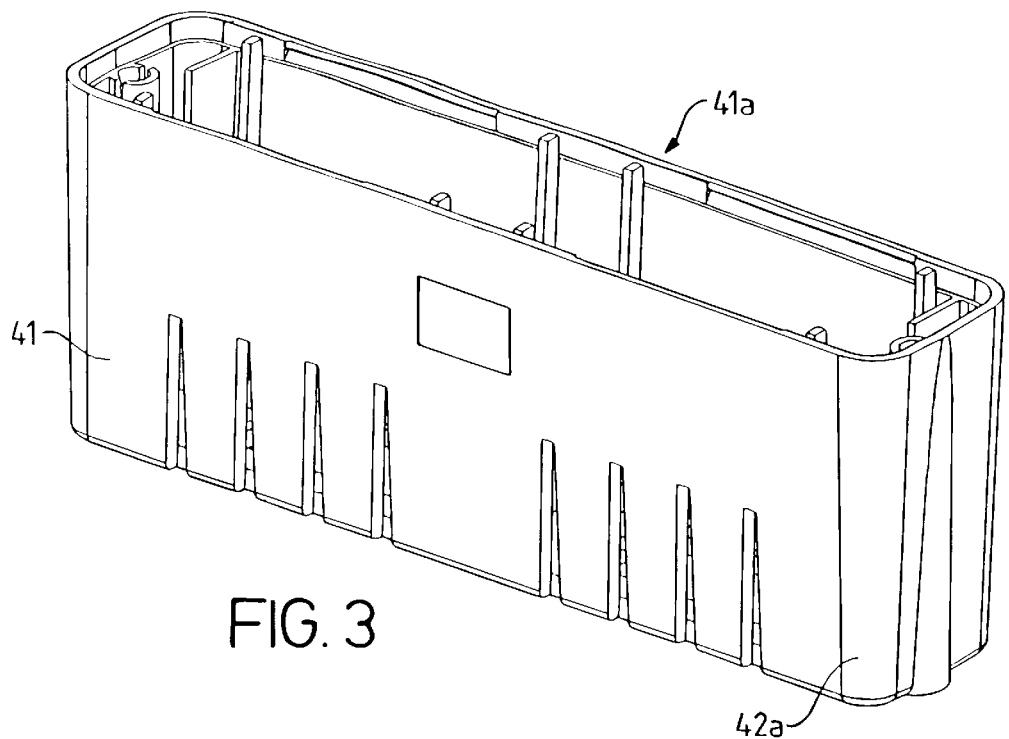
FIG. 3 and FIG. 4 are two different views of one part of a housing of an extender according to the invention.
Figure 4:
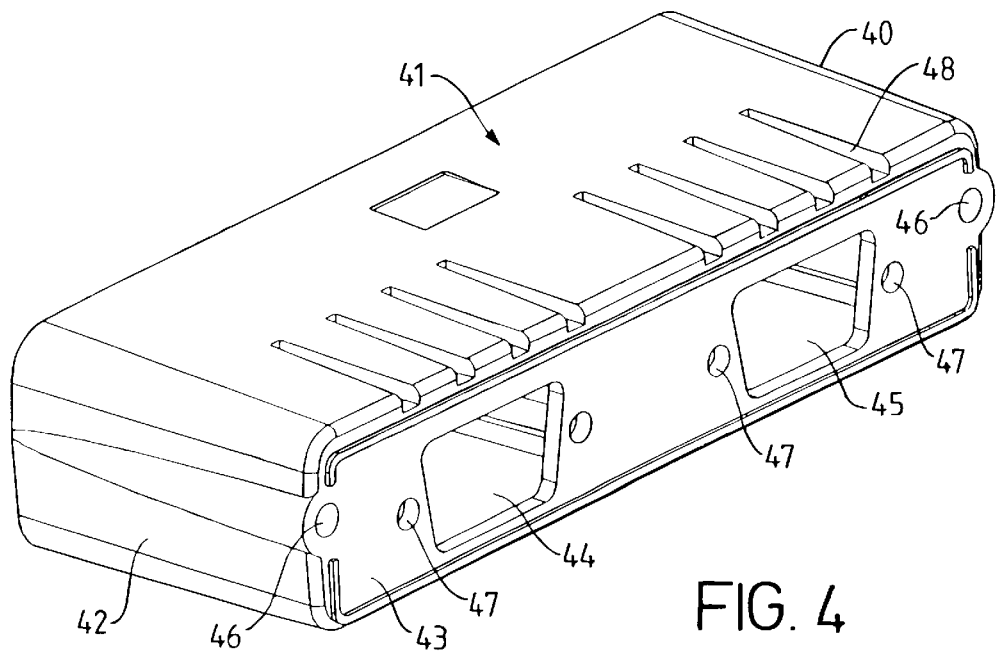

FIGS. 3 and 4 of the drawings illustrate a front part 40 of an extender housing in a preferred embodiment of the invention. The housing part 40 is in the shape of a generally slightly tapered rectangular tub. It has two side walls 41 and 41a and two end walls 42 and 42a. A bottom or end wall 43 of the housing part 40 has two apertures 44 and 45 through which the port connectors of the extender can protrude. End wall 43 includes apertures 46 for the fixing screws (to be described) securing the housing parts together and further apertures 47 for screws which secure terminal connectors of the extender in position relative to the apertures 44 and 45 (as shown in FIGS. 7 and 8).

Figure 5:
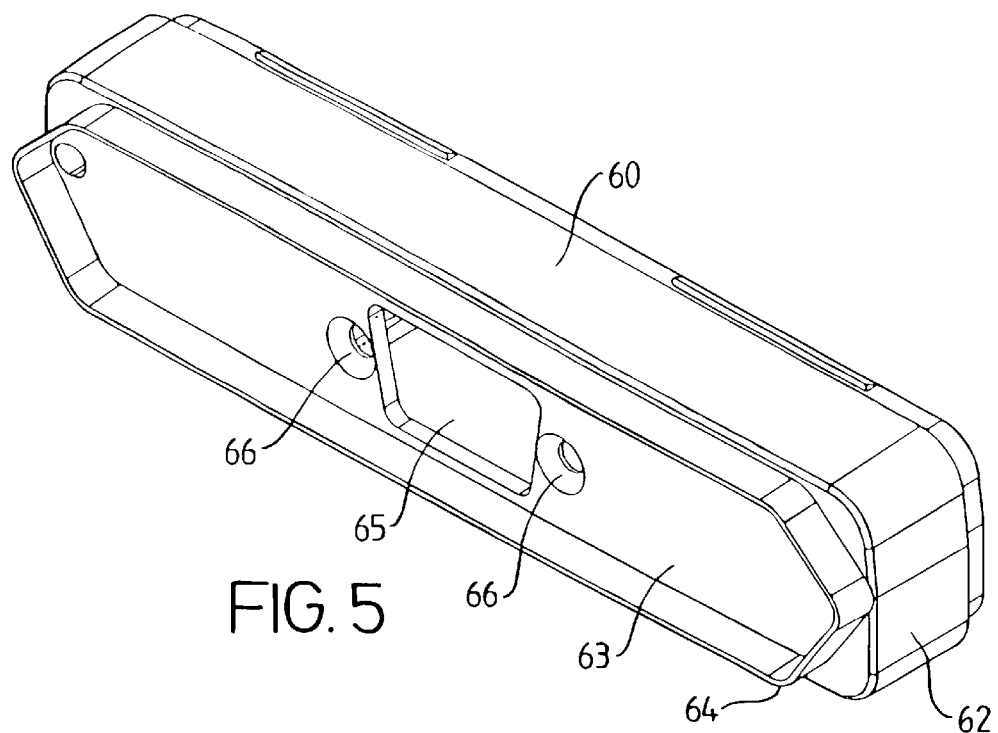
FIG. 5 and FIG. 6 are different views of another part of the housing according to the invention.
Figure 6:
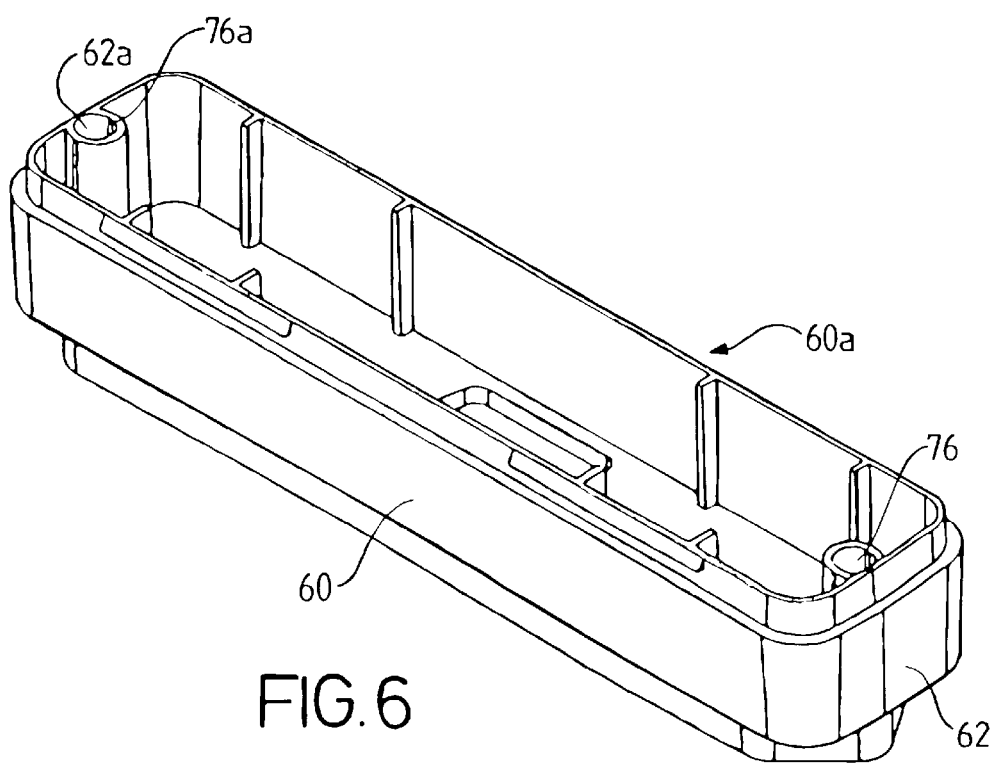

FIGS. 5 and 6 illustrate two perspective views of the rear part of the extender housing. This rear part 60 is in the general shape of a rectangular trough having broad side walls 60 and 60a, narrow side walls 62 and 62a and an end or bottom wall 63 which has a peripheral lip 64 that can engage a corresponding part of a cascade module. End wall 63 has aperture 65 for allowing protrusion of a terminal port connector and includes apertures 66 for small fixing screws by means of which the respective terminal connector is secured to the end wall 63 and located relative to aperture 65. Part 60 also includes threaded anchorages 76 and 76a for the screws which hold parts 40 and 60 together.

Figure 7:
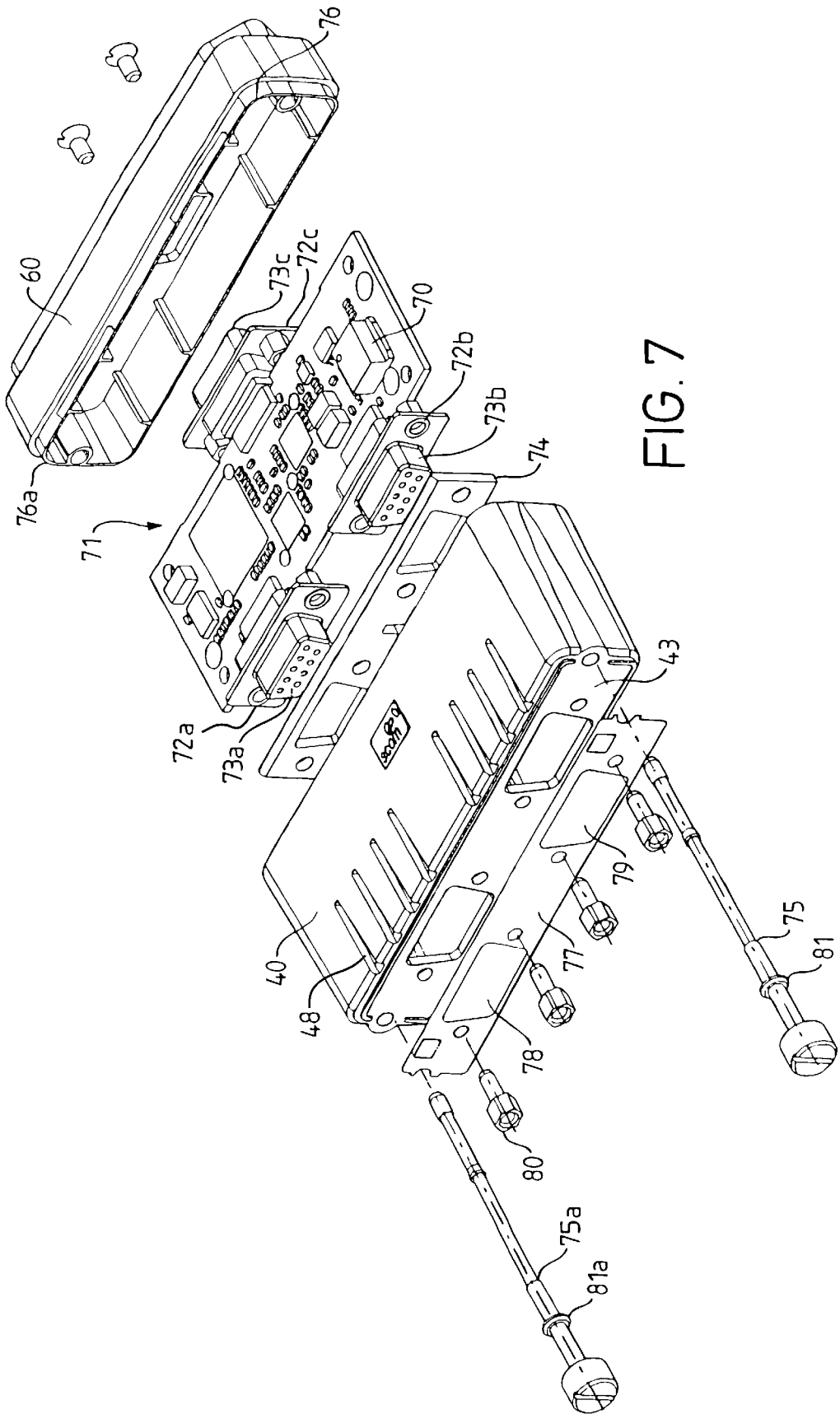
FIG. 7 is an 'exploded' perspective view of an extender according to the invention.
Figure 8:
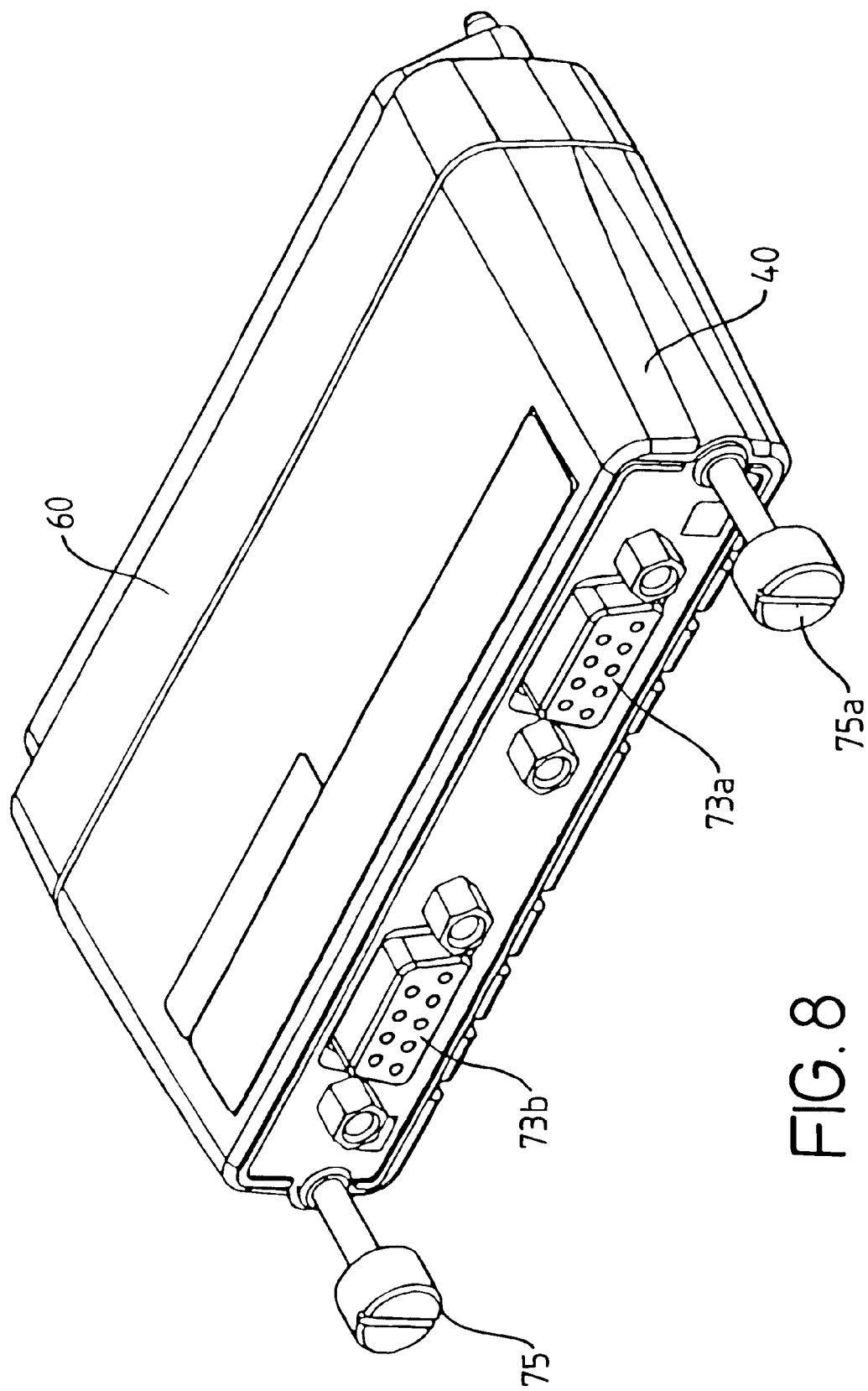
FIG. 8 is a perspective view of an assembled extender according to the invention.

FIG. 7 illustrates in exploded form the extender constituted by the parts 40 and 60 as well as the internal parts to be described. FIG. 8 illustrates the assembled extender from the underside.

FIG. 7 includes, in addition to the parts 40 and 60 as previously described a printed circuit board 70 carrying electronic components 71 organised as, for example, described with reference to FIG. 2. At one side of the printed circuit board are two multi-socket terminal connectors 73a and 73b whereas at the other side is a third multi-pin terminal connector 73c, i.e. of opposite connectivity type (male) to that of the other two connectors (female). These terminal connectors are in conventional form, and are intended to protrude respectively through the apertures 44 and 45 in part 40 and aperture 65 in part 60. Each of the connectors has a respective plate 72a 72b and 72c, having screw anchorages which are engaged by internally threaded screw-locks, such as screwlock 80, that in the case of part 40 extend through apertures 47 to engage the anchorage points in the plate 72a. The plates 72b and 72c are similarly secured to the end walls of the part 40 and the part 60 as the case may be by the respective fixing screws.

Fitting adjacent the end wall 43 of the part 40 is apertured conductive plate 77. This has apertures 78 and 79 which are aligned with the apertures 44 and 45 (FIG. 4) of the housing part 40. This plate is also secured to the end wall by means of the fixing screws 80 that secure the plates 72a and 72b to the end wall 43.

The two parts of the housing are secured by means of two long fixing screws 75 and 75a that pass through the side walls of housing part 40 and engage screw anchorages 76 and 76a provided in the housing part 60. These screws do not contact the conductive coating described below.

Each of the fixing screws 75 and 75a has a collar 81 and 81a respectively which engages the conductive plate 77 when the fixing part is fully screwed.

The internal surfaces of both the housing parts 40 and 60 have a sputtered coating of a conductive paint, comprising copper or a suitable copper alloy or a silver/nickel alloy, or other appropriate conductive material so that when the parts are fitted together there is a substantial Faraday cage formed around the printed circuit board 70 and the circuit component 71 disposed on it. The coating extends over the lips of the housing so that there is electrical contact between the two housing parts.

As is shown in FIGS. 3, 4 and 7, the part 40 has in wall 41 narrow slits 48 which act as air vents in the vicinity of the port connectors 73a and 73b. The vents allow cooling by natural convection.

What is claimed is:

1. An extender for use in with a cascade stack of network devices, comprising:

(a) an electronic circuit which has three ports each for the reception and transmission of data messages, and circuit connections coupling each of the three ports to each of the other two ports;

(b) port connectors for each port;

(c) a two-part housing of which a first part has an end wall having two apertures for the protrusion of a first and a second of said port connectors respectively and a second part has an end wall having an aperture for the protrusion of a third of said port connectors; and (d) fixing means for securing said first and second housing parts together to enclose the electronic circuit.

2. An extender according to claim 1 wherein each of the housing parts has an internal conductive coating so as to constitute a Faraday cage around said electronic circuit.

3. An extender according to claim 1 wherein said fixing means comprises fixing screws extending within side walls of said first housing part to anchorages in said second housing part.

4. A network extender comprising:

(i) a housing composed of two principal interfitting parts, said parts consisting of:

a first elongate open tub having side walls and an end wall, said end wall including two apertures; and a second trough shaped part having an end wall with an aperture therein and side walls having a margin interfitting with a margin of the side walls of the first part;

(ii) a three-port electronic circuit having multiplexer connections coupling each of the ports to each of the two other ports; and (iii) connector assemblies for each of said ports, said connector assemblies each protruding from a respective one of said apertures.

5. An extender for use in a cascade stack of network devices, said extender comprising:

(a) an electronic circuit which has first, second and third ports each for the reception and transmission of data messages, and circuit connections enabling data messages received at any of the ports to be forwarded from either of the other two ports;

(b) first second and third port connects, one for each of said ports, (c) a two-part housing of which a first part is in the form of a tub having side walls and an end wall, said end wall having two apertures for the protrusion of the first and a second of said port connectors respectively and a second part is in the form of a trough having side walls and an end wall having an aperture for the protrusion and third of said port connections; and (d) fixing means for securing said first and second housing parts together to enclose the electronic circuit.

6. An extender as in claim 5 wherein each of the first and second parts has an internal conductive coating so as to constitute a Faraday cage around said electronic circuit.

7. An extender as in claim 5 wherein said fixing means comprises fixing screws extending within side walls of said first housing part to anchorages in said second housing part.

8. A network extender comprising:

(i) a housing composed of two principal interfitting parts, said parts including a first, elongate open tube having side walls and an end wall, said end wall including two apertures, and a second trough shaped part having an end wall with an aperture therein and side walls having a margin interfitting with a margin of the side walls of the first part, (ii) an electronic circuit having three ports, each port having lines for the reception and transmission of data messages and lines for the reception and transmission of control messages, said electronic circuit further comprising multiplexer connections for coupling data messages received at any of said ports to either one of the other two ports, and a logic circuit coupled to receive said control messages coupling each of the ports to each of the two other ports; and (iii) three connector assemblies, one for each of said ports, said connector assemblies each protruding from a respective one of said apertures.

9. An extender for use in a cascade stack of network devices, said extender comprising:

(a) an electronic circuit disposed on a generally planar circuit board having a first I/O port at one edge of the board and having second and third spaced-apart I/O ports at an opposite edge of the board, each of said ports being interconnected by electronic signal processing circuits enabling digital data messages received at any one of the ports to be forwarded from either of the other two ports;

(b) a male port connector attached to said first I/O port and having connection pins therein extending generally parallel to said board;

(c) first and second spaced-apart female port connectors respectively attached to said second and third I/O ports and having connection sockets therein extending generally parallel to said board;

(d) a two-part hollow housing adapted to contain said electronic circuit therewithin and having (i) a first opening in an end wall of a first, trough-shaped, part of the hollow housing through which said male port connector extends and (ii) second and third spaced-apart openings in an end wall of a second, tub-shaped, part of the hollow housing through which said female port connectors respectively extend, and (e) fixing means for securing said first and second housing parts together to enclose said electronic circuit.

10. An extender as in claim 9 wherein each of the first and second parts has an internal conductive coating so as to constitute a Faraday cage around said electronic circuit.

11. An extender as in claim 9 wherein said fixing means comprises fixing screws extending within side walls of said first housing part to anchorages in said second housing part.

\* \* \* \* \*